United States Patent
Huang et al.

(10) Patent No.: US 9,740,344 B2
(45) Date of Patent: Aug. 22, 2017

(54) TOUCH SCREEN AND MANUFACTURING METHOD THEREOF, DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Weiyun Huang, Beijing (CN); Young Yik Ko, Beijing (CN); Yingying Nan, Beijing (CN); Minghua Xuan, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 14/361,896

(22) PCT Filed: Dec. 9, 2013

(86) PCT No.: PCT/CN2013/088907
§ 371 (c)(1),
(2) Date: May 30, 2014

(87) PCT Pub. No.: WO2015/035716
PCT Pub. Date: Mar. 19, 2015

(65) Prior Publication Data
US 2015/0077650 A1  Mar. 19, 2015

(30) Foreign Application Priority Data

Sep. 13, 2013  (CN) .......................... 2013 1 0419164

(51) Int. Cl.
*G06F 3/044* (2006.01)

(52) U.S. Cl.
CPC .... *G06F 3/044* (2013.01); *G06F 2203/04111* (2013.01); *G06F 2203/04112* (2013.01); *Y10T 29/49147* (2015.01)

(58) Field of Classification Search
CPC .. G06F 2203/04111; G06F 2203/04112; G06F 3/044; G06F 2203/04108
See application file for complete search history.

(56) References Cited

U.S. PATENT DOCUMENTS

2008/0277259 A1  11/2008 Chang
2010/0045625 A1*  2/2010 Yang ...................... G06F 3/044
                                                              345/173

(Continued)

FOREIGN PATENT DOCUMENTS

CN  101699377 A  4/2010
CN  101847065 A  9/2010

(Continued)

OTHER PUBLICATIONS

Machine Translation of CN Publication No. 103268174 by Ma, Yuping on Aug. 28, 2013.*

(Continued)

*Primary Examiner* — Latanya Bibbins
(74) *Attorney, Agent, or Firm* — Ladas & Parry LLP

(57) ABSTRACT

A touch screen includes a plurality of first transparent electrodes extending in a first direction and a plurality of second transparent electrodes extending in a second direction intersecting the first direction disposed on the substrate; first conductive layers located on at least one side of the first transparent electrodes and connected in parallel with the first transparent electrodes; and/or second conductive layers located on at least one side of the second transparent electrodes and connected in parallel with the second transparent electrodes; the first conductive layers and the second conductive layers are metal layers or alloy layers. A manu- (Continued)

facturing method of the touch screen and a display device having the touch screen are further disclosed.

20 Claims, 7 Drawing Sheets

(56) References Cited

U.S. PATENT DOCUMENTS

| | | |
|---|---|---|
| 2010/0321308 A1 | 12/2010 | Lin et al. |
| 2011/0007020 A1* | 1/2011 | Hong .................. G06F 3/0412 345/174 |
| 2011/0134055 A1* | 6/2011 | Jung et al. .................... 345/173 |
| 2011/0187676 A1 | 8/2011 | Chang et al. |
| 2011/0242444 A1* | 10/2011 | Song .................... G06F 3/0412 349/43 |
| 2012/0012450 A1 | 1/2012 | Liu et al. |
| 2012/0081333 A1* | 4/2012 | Ozeki et al. ................. 345/174 |
| 2012/0193210 A1* | 8/2012 | Yau et al. ..................... 200/600 |
| 2013/0201348 A1* | 8/2013 | Li ........................... G06F 3/044 348/174 |
| 2014/0111709 A1* | 4/2014 | Kim et al. ...................... 349/12 |
| 2014/0152921 A1* | 6/2014 | Yashiro et al. ................ 349/12 |

FOREIGN PATENT DOCUMENTS

| | | |
|---|---|---|
| CN | 201622554 U | 11/2010 |
| CN | 102467303 A | 5/2012 |
| CN | 102566838 A | 7/2012 |
| CN | 103268174 A | 8/2013 |
| CN | 203535595 U | 4/2014 |
| TW | 200844827 A | 11/2008 |
| TW | 201101133 A | 1/2011 |
| TW | 430654 U | 6/2012 |

OTHER PUBLICATIONS

International Search Report Issued Jun. 23, 2014; Appln. No. PCT/CN2013/088907.
First Chinese Office Action Appln. No. 201310419164.3; Dated Nov. 11, 2015.
Second Chinese Office Action dated Mar. 8, 2016; Appln. No. 201310419164.3.
International Preliminary Report on Patentability issued Mar. 15, 2016; PCT/CN2013/088907.

\* cited by examiner

TOUCH SCREEN AND MANUFACTURING METHOD THEREOF, DISPLAY DEVICE

TECHNICAL FIELD

Embodiments of the present invention relate to a touch screen and a manufacturing method thereof, and a display device.

BACKGROUND

In the display technology field, touch screens have been applied more and more widely as new input devices.

Depending on touch input ways, touch screens include resistive, capacitive, optical, sound wave and electromagnetic types. Capacitive touch panels have advantages of fast response time, high reliability and high durability. According to the integration modes with display devices, touch screens are classified into at least in-cell and add-on types.

For a structure of a touch screen, it is generally to form touch driving electrodes and touch sensing electrodes for realizing touch function in a touch area. At present, a multipoint touch-type touch screen is based on the coupling capacitance (namely mutual capacitance Cm) at intersections of touch driving electrodes and touch sensing electrodes and determines the location of a touch point by the change of the magnitude of coupling capacitance when a finger touches the touch screen.

At present, signal delay of touch driving electrodes and touch sensing electrodes has become one of the key factors that limit large size touch screens. Specifically, signal delay time T is mainly determined by RC in which R is resistance of touch driving electrode and touch sensing electrode, and C is the coupling capacitance Cm and the parasitic capacitance. If the signal delay is large, it will severely influence touch effect of a touch screen, such as the touch accuracy and sensitivity. The problem of signal delay is severe in large size touch screens.

At present, in order to not influence the display effect, most touch screens use transparent electrodes for touch driving electrodes and touch sensing electrodes, for example, using metal oxide film layer or carbon nano materials for touch driving electrodes and touch sensing electrodes. The metal oxide film layer or carbon nano material has high resistivity and large signal delay T=RC occurs, and therefore the touch effect is poor. Particularly for large size touch screens, the touch effect is even more poor due to signal delay.

SUMMARY

Embodiments of the present invention provide a touch screen and a manufacturing method thereof, and a display device for realizing a touch screen and a display device with better touch effect.

A touch screen provided in an embodiment of the present invention includes: a plurality of first transparent electrodes and a plurality of second transparent electrodes disposed on a substrate; first conductive layers located on at least one side of the first transparent electrodes and connected in parallel with the first transparent electrodes, and/or second conductive layers located on at least one side of the second transparent electrodes and connected in parallel with the second transparent electrodes. One set of the first transparent electrodes and the second transparent electrodes are touch driving electrodes, the other set are touch sensing electrodes, and the first conductive layers and the second conductive layers are metal layers or alloy layers.

For example, the first transparent electrodes extend in a first direction and the second transparent electrodes extend in a second direction.

For example, the first transparent electrodes are broken into a plurality of first transparent sub-electrodes at intersection areas with the second transparent electrodes; and adjacent first transparent sub-electrodes are connected through a conductive sheet.

For example, the first transparent electrodes and the second transparent electrodes extend in the first direction and are arranged by coupling without any intersection, crossover and joint therebetween.

For example, the first transparent electrodes are provided with a plurality of hollowed-out areas of regular pattern, which are non-closed hollowed-out areas with openings at edges of the first transparent electrodes; the second transparent electrodes comprise a plurality of sub-electrodes disposed at hollowed-out areas of the first transparent electrodes, each of the sub-electrodes is connected by a wire adjacent to the first transparent electrodes, the wire is connected with corresponding sub-electrodes through an opening at an edge of the first transparent electrodes and is insulated from the first transparent electrodes.

For example, the first conductive layers comprise a plurality of first electrodes extending in the first direction; the second conductive layers comprise a plurality of second electrodes extending in a second direction intersecting first direction.

For example, the first transparent electrodes is slit-like, and slits of the first transparent electrodes coincide with projections of slits between the first electrodes on the substrate; the second transparent electrodes is slit-like, and slits of the second transparent electrodes coincide with projections of slits between the second electrodes on the substrate.

For example, the first conductive layers further comprise a plurality of third electrodes extending in the second direction, and the first electrode and the third electrodes constitute the grid-like first conductive layer; the second conductive layers further comprise a plurality of fourth electrodes extending in the first direction, and the second electrode and the fourth electrodes constitute the grid-like second conductive layer.

For example, the first transparent electrodes are grid-like, and hollowed-out areas in the grid-like first transparent electrodes coincide with projections, on the substrate, of hollowed-out areas in the grid-like first conductive layer; the second transparent electrodes are grid-like, and hollowed-out areas in the grid-like second transparent electrodes coincide with projections, on the substrate, of hollowed-out areas in the grid-like second conductive layer.

For example, the first conductive layers are formed of metallic copper, metallic aluminum, metallic molybdenum or metallic neodymium or an alloy containing at least two metals of metallic copper, metallic aluminum, metallic molybdenum or metallic neodymium; the second conductive layers are formed of metallic copper, metallic aluminum, metallic molybdenum or metallic neodymium or an alloy containing at least two metals of metallic copper, metallic aluminum, metallic molybdenum or metallic neodymium.

For example, the first transparent electrodes and the second transparent electrodes are formed by connecting in series a plurality of diamond shaped sub-electrodes respectively; or the first transparent electrodes and the second transparent electrodes are formed by connecting in series a plurality of rectangular sub-electrodes respectively; or the second transparent electrodes are strip-like electrodes.

For example, the touch screen may further include: first leads for connecting the first transparent electrodes with a signal source for providing signals to the first transparent electrodes; second leads for connecting the second transparent electrodes with a signal source for providing signals to the second transparent electrodes. The first conductive layers further include parts on at least one side of the first leads and connected in parallel with the first leads; the second conductive layers further include parts on at least one side of the second leads and connected in parallel with the second leads.

A manufacturing method of touch screen provided in an embodiment of the present invention includes: forming a plurality of first transparent electrodes and a plurality of second transparent electrodes on a substrate; and forming first conductive layers connected in parallel with the first transparent electrodes on at least one side of the first transparent electrodes, and/or forming second conductive layers connected in parallel with the second transparent electrodes on at least one side of the second transparent electrodes. Wherein the first conductive layers and the second conductive layers are metal layers or alloy layers.

For example, the method may specifically include the following steps: forming first transparent electrodes extending in a first direction and second transparent electrodes extending in a second direction intersecting the first direction on the substrate at the same time, the first transparent electrodes being broken into a plurality of first transparent sub-electrodes at intersection areas with the second transparent electrodes; forming the first conductive layers and the second conductive layers on the substrate foamed with the first transparent electrodes and the second transparent electrodes in areas where the first transparent sub-electrodes and the second transparent electrodes are located respectively; forming an insulation layer on the substrate formed with the first conductive layers and the second conductive layers at intersection areas of the second conductive layers and the first conductive layer; forming a conductive sheet connected with two adjacent first transparent sub-electrodes on the substrate formed with the insulation layer and on the insulation layer at the intersection areas. Alternatively, for example, the method may specifically include the following steps: forming first conductive layers arranged in a first direction and second conductive layers arranged in a second direction intersecting the first direction on the substrate at the same time, the first conductive layers are broken at intersection areas with the second conductive layers; forming the first transparent electrodes and the second transparent electrodes on the substrate formed with the first conductive layers and the second conductive layers and in areas where the first conductive layers and the second conductive layers are located respectively, the first transparent electrodes being broken into a plurality of first transparent sub-electrodes at intersection areas with the second transparent electrodes; forming an insulation layer on the substrate formed with the first transparent electrodes and the second transparent electrodes and on the second transparent electrodes at intersection areas with the first transparent electrodes; forming a conductive sheet electrically connected with two adjacent first transparent sub-electrodes on the substrate formed with the insulation layer and on the insulation layer at the intersection areas.

For example, the method may specifically include the following steps: forming first transparent electrodes arranged in a first direction on the substrate; forming the first conductive layers on the substrate formed with the first transparent electrodes and in areas where the first transparent electrodes are located; forming an insulation layer on the substrate formed with the first transparent electrodes and the first conductive layers at intersection areas of the first transparent electrodes and second transparent electrodes to be formed; forming second transparent electrodes arranged in a second direction intersecting the first direction on the substrate formed with the insulation layer; forming the second transparent electrodes on the substrate formed with the second conductive layers and in areas where the second conductive layers are located. Alternatively, for example, the method may specifically include the following steps: forming the first conductive layers on the substrate; forming first transparent electrodes on the substrate formed with the first conductive layers and in areas where the first conductive layers are located; forming an insulation layer on the substrate formed with the first transparent electrodes and the first conductive layers at intersection areas of the first transparent electrodes and second transparent electrodes to be formed; forming the second conductive layers intersecting the first conductive layers on the substrate formed with the insulation layer and on the insulation layer; forming the second transparent electrodes on the substrate formed with the second conductive layers and in areas where the second conductive layers are located.

For example, the method may specifically include the following steps: forming first transparent electrodes and second transparent electrodes arranged in the same direction on the substrate at the same time; the first transparent electrodes and the second transparent electrodes being arranged by coupling without intersection, crossover and joint; forming first conductive layers and second conductive layers on the substrate formed with the first transparent electrodes and the second transparent electrodes and in areas where the first transparent electrodes and the second transparent electrodes are located. Alternatively, for example, the method may specifically include the following steps: forming first conductive layers and second conductive layers arranged in a first direction on the substrate at the same time; the first conductive layers and the second conductive layers being arranged by coupling without intersection, crossover and joint; forming first transparent electrodes and second transparent electrodes on the substrate formed with the first conductive layers and the second conductive layers in areas where the first conductive layers and the second conductive layers are located respectively.

For example, the method may further comprises before forming first conductive layers and second conductive layers on the first transparent electrodes and the second transparent electrodes respectively and before forming first transparent electrodes and the second transparent electrodes: forming the first conductive layers and the second conductive layers at areas to be formed with the first transparent electrodes and the second transparent electrodes respectively; or The method further comprises after forming of the first conductive layers and the second conductive layers and after forming of the first transparent electrodes and the second transparent electrodes on the first conductive layers and the second conductive layers respectively: forming the first conductive layers and the second conductive layers again on the first transparent electrodes and the second transparent electrodes respectively.

For example, while forming the first transparent electrodes and/or second transparent electrodes, following a first lead and/or a second lead for connecting the first transparent electrodes and/or the second transparent electrodes to a signal source, and forming first conductive layers on at least one side of the first lead, Forming second conductive layers on at least one side of the second lead.

An embodiment of the present invention provides a display device including the above-mentioned touch screen.

For example, the first transparent electrodes are slit-like, and slits of the first transparent electrodes coincide with projections of slits between the first electrodes in the vertical direction; the second transparent electrodes are slit-like, and slits of the second transparent electrodes coincide with projections of slits between the second electrodes in the vertical direction; slits in the first transparent electrodes and slits in the second transparent electrodes correspond to transmitting areas of pixels in the display device. Alternatively, for example, the first transparent electrodes are grid-like, and slits of the first transparent electrodes coincide with projections of slits between the first electrodes and the third electrodes in the vertical direction; the second transparent electrodes are grid-like, and slits of the second transparent electrodes coincide with projections of slits between the second electrodes and the fourth electrodes in the vertical direction; slits in the first transparent electrodes and slits in the second transparent electrodes correspond to transmitting areas of pixels in the display device.

For example, the first conductive layers and the second conductive layers in the touch screen are located in areas corresponding to the black matrix in the display screen.

In summary, the touch screen provided in embodiments of the present invention can reduce signal delay of transparent electrodes, improve touch accuracy and sensitivity of the touch screen and hence improve the touch effect of the touch screen.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
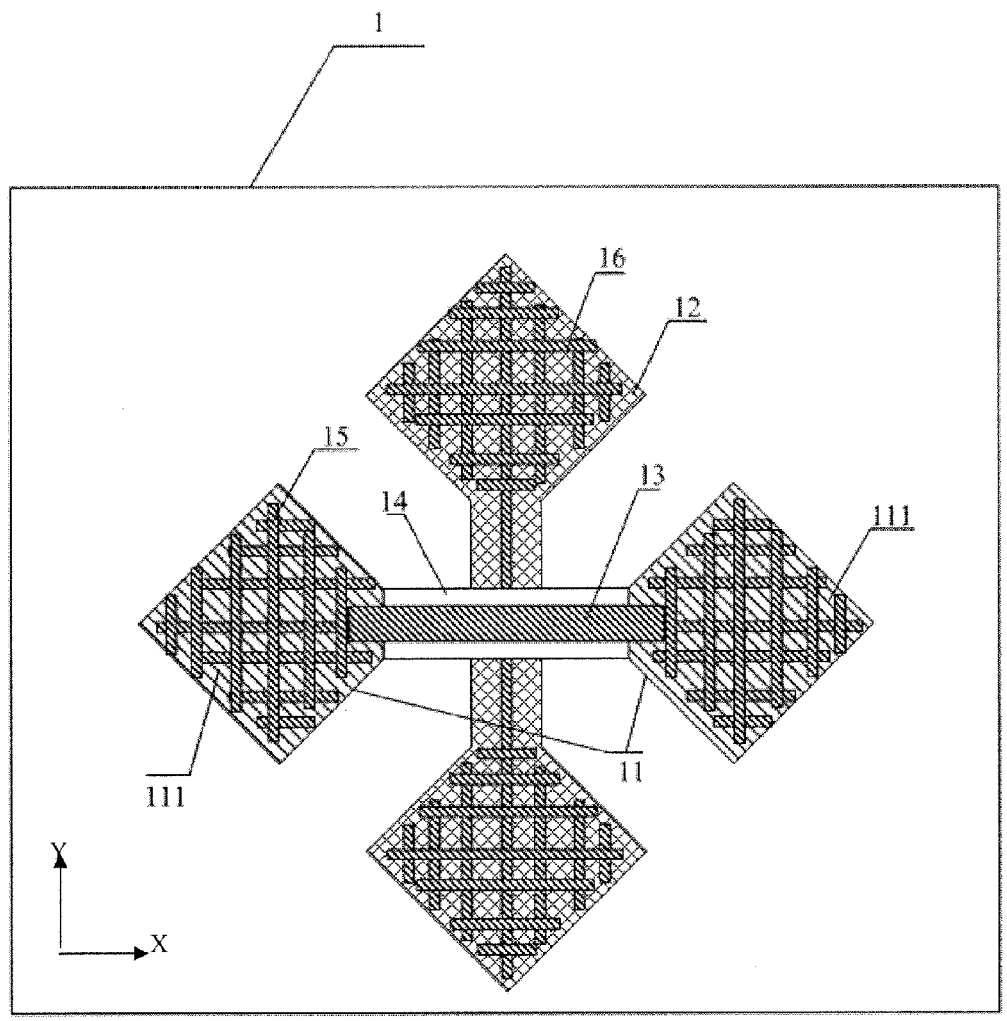
FIG. 1 is a schematic top view of a touch screen provided in embodiment I of the present invention.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Embodiments of the present invention provide a touch screen and a manufacturing method thereof, and a display device for realizing a touch screen with high touch accuracy and sensitivity and hence realizing a touch screen with better touch effect.

The touch screen provided in embodiments of the present invention is improved according to any of the following three modes.

1. One-and-half-layer type touch screen in which touch driving electrodes and touch sensing electrodes are disposed in the same layer and have intersection areas.

2. Two-layer type touch screen in which touch driving electrodes and touch sensing electrodes are disposed in different layers.

3. Single-layer type touch screen in which touch driving electrodes and touch sensing electrodes are disposed in the same layer without intersection, crossover and joint.

As for the touch screens provided in embodiments of the present invention, for any type of the above-mentioned touch screens, a conductive layer is provided on at least one side of touch driving electrodes and/or touch sensing electrodes, which is a metal or alloy layer with high conductivity. The conductive layer on the touch driving electrode is connected in parallel with the touch driving electrode and the conductive layer on the touch sensing electrode is connected in parallel with the touch sensing electrode, such that the integrated structure of the combined conductive layer and the touch driving electrode or the touch sensing electrode has increased conductivity and reduced resistance. Given a fixed area of the touch driving electrode or the touch sensing electrode, the touch driving electrode and/or the touch sensing electrode provided with the conductive layer has reduced signal delay RC and the touch screen has increased touch accuracy and sensitivity.

It is to be noted that the first conductive layer and the second conductive layer in embodiments of the present invention may be located on a side surface of the first transparent electrode and a side surface of the second transparent electrode respectively, that is, on one or two sides of the first transparent electrode and the second transparent electrode that contact the substrate or other layers on the substrate. One of the first transparent electrode and the second transparent electrode provided in all embodiments of the present invention is the touch driving electrode, the other is the touch sensing electrode.

Embodiment I: Based on One-and-Half-Layer Type Touch Screen

Figure 2:
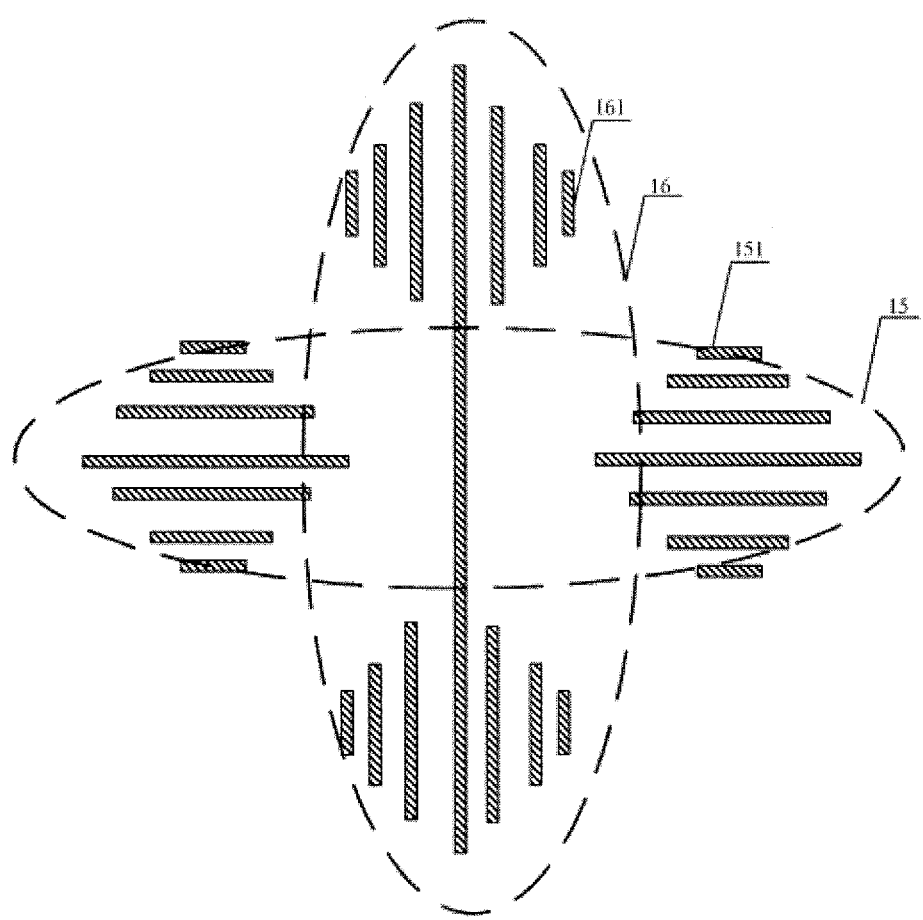
FIG. 2 is a structure diagram I of a first conductive layer and a second conductive layer in the touch screen provided in embodiment I of the present invention.

FIG. 1 is a schematic top view of a touch screen provided in embodiment I of the present invention. The touch screen includes: a substrate 1; a plurality of first transparent electrodes 11 arranged in a first direction on the substrate 1; and a plurality of second transparent electrodes 12 arranged in a second direction on the substrate 1. The first transparent electrode 11 is broken into a plurality of first transparent sub-electrodes 111 in an intersection area, and adjacent two first transparent sub-electrodes 111 are electrically connected by a conductive sheet 13, and the conductive sheet 13 is insulated from the non-broken second transparent electrode 12 via an insulation layer 14. The conductive sheet 13 may be a metal lead or a transparent electrode lead. FIGS. 1 and 2 show only one first transparent electrode 11 and one second transparent electrode 12.

The first direction and the second direction are perpendicular to each other or form a certain angle such that the first transparent electrode 11 and the second transparent electrode 12 are arranged crosswise. In the present embodiment, description is given with respect to an example in which the first direction is the row direction (X direction) of pixels of the display screen and the second direction is the column direction (Y direction).

The first transparent electrode 11 is provided with a first conductive layer 15 on at least one side thereof, and the first conductive layer 15 is located in the area where the first transparent electrode 11 is located, that is, a projection of the first conductive layer 15 on the substrate 1 is in the projection of the first transparent electrode 11 on the substrate 1; and/or the second transparent electrode 12 is provided with a second conductive layer 16 on at least one side thereof, the second conductive layer 16 is located in the area where the second transparent electrode 12 is located, that is, a projection of the second conductive layer 16 on the substrate 1 is in the projection of the second transparent electrode 12 on the substrate 1.

The first conductive layer 15 and the second conductive layer 16 are connected in parallel with the first transparent electrode 11 and the second transparent electrode 12 respectively, and the first conductive layer 15 and the second conductive layer 16 are metal layers or alloy layers.

In the touch screen illustrated in FIG. 1, a first conductive layer 15 and a second conductive layer 16 are respectively disposed in areas where the first transparent electrode 11 and the second transparent electrode 12 are located and on at least one side of the first transparent electrode 11 and at least one side of the second transparent electrode 12.

Taking the first conductive layer 15 disposed on the first transparent electrode 11 as an example, the first conductive layer 15 made of for example a metal or an alloy has a conductivity much greater than that of the first transparent electrode 11, the first conductive layer 15 is located on one or both sides of the first transparent electrode 11 and they are connected in parallel. The first transparent electrode 11 provided with the first conductive layer 15 as a whole has resistance much lower than that of the first transparent electrode 11 itself. The signal delay T through the first transparent electrode 11 is determined by RC, in which resistance R is the resistance for the signal to pass through the first transparent electrode 11, and capacitance C is the coupling capacitance between the first transparent electrode 11 and the second transparent electrode 12.

According to the formulae $C=\epsilon S/d$, the capacitance C is proportional to the area S of the first transparent electrode 11 and the second transparent electrode 12, and is inversely proportional to the distance d between the first transparent electrode 11 and the second transparent electrode 12. Here, when the first transparent electrode 11 and the second transparent electrode 12 are in different layers, the distance d is the thickness of the insulation layer interposed between them; when the first transparent electrode 11 and the second transparent electrode 12 are in the same layer, the distance d is the vertical distance between the conductive sheet 13 (namely the throw-over metal layer) and the transparent electrodes. $\epsilon$ is the dielectric constant of the dielectric (layer) between the electrodes.

When the area S and the distance d are fixed, the capacitance C is fixed, the resistance for the signal to pass through the first transparent electrode is reduced, and the signal delay T is reduced, and thus touch accuracy and sensitivity of the touch screen are improved.

Preferably, for example, first conductive layers 15 disposed on both sides of the first transparent electrode 11 are in mirror symmetry.

Preferably, for example, second conductive layers 16 disposed on both sides of the second transparent electrode 12 are in mirror symmetry.

With reference to an example in which a first conductive layer 15 and a second conductive layer 16 are respectively provided on one side of the first transparent electrodes 11 and one side of the second transparent electrodes 12, the arrangement of the first conductive layer 15 and the second conductive layer 16 and the arrangement of the first transparent electrode 11 and the second transparent electrode 12 will be described in detail below.

Preferably, referring to FIG. 2, the first conductive layer 15 may include a plurality of first electrodes 151 extending in the first direction; and the second conductive layer 16 includes a plurality of second electrodes 161 extending in the second direction. The first electrodes 151 constitute a slit-like first conductive layer 15, and the second electrodes 161 constitute a slit-like second conductive layer 16.

Figure 3:
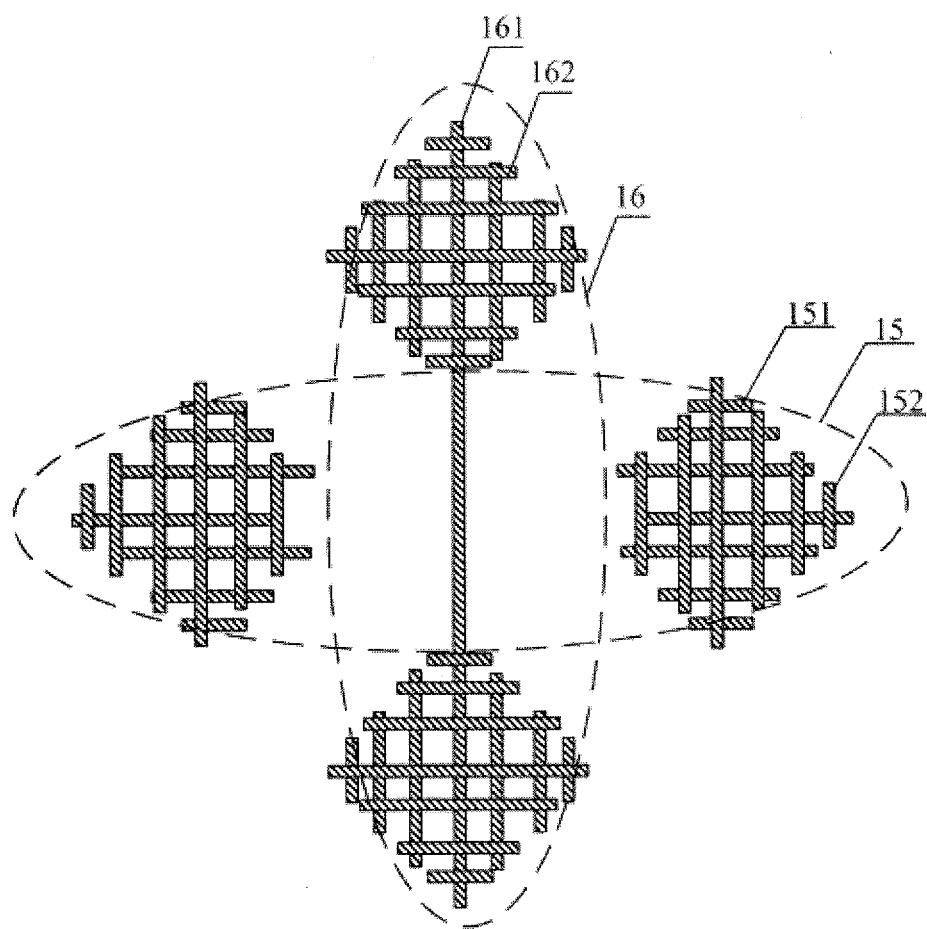
FIG. 3 is a structure diagram II of a first conductive layer and a second conductive layer in the touch screen provided in embodiment I of the present invention.

Preferably, referring to FIG. 3, the first conductive layer 15 may further include third electrodes 152 that extend in the second direction and constitute a grid-like first conductive layer 15 with the first electrodes 151; and the second conductive layer 16 may further include four electrodes 162 that extend in the first direction and constitute a grid-like second conductive layer 16 with the second electrodes 161. In the touch screen as illustrated in FIG. 1, the first conductive layer 15 and the second conductive layer 16 are grid-like conductive layers.

The first transparent electrodes 11 and the second transparent electrodes 12 as illustrated in FIG. 1 are planar electrodes, namely electrodes without any hollowed-out areas.

Preferably, in order to further reduce the signal delay of the first transparent electrodes and the second transparent electrodes, it is possible to provide hollowed-out areas in at least one set of the first transparent electrodes and the second transparent electrodes. First transparent electrodes or second transparent electrodes with hollowed-out areas have reduced effective areas. Since the capacitance C in the signal delay RC is proportional to the area S of the first transparent electrodes and the second transparent electrodes, when the effective areas of the first transparent electrodes or the second transparent electrodes decreases, signal delay RC decreases as well. Therefore, hollowed-out areas are provided in the first transparent electrodes and the second transparent electrodes respectively such that signal delay of the first transparent electrodes is reduced further, and signal delay of the second transparent electrodes is reduced further.

Figure 4:
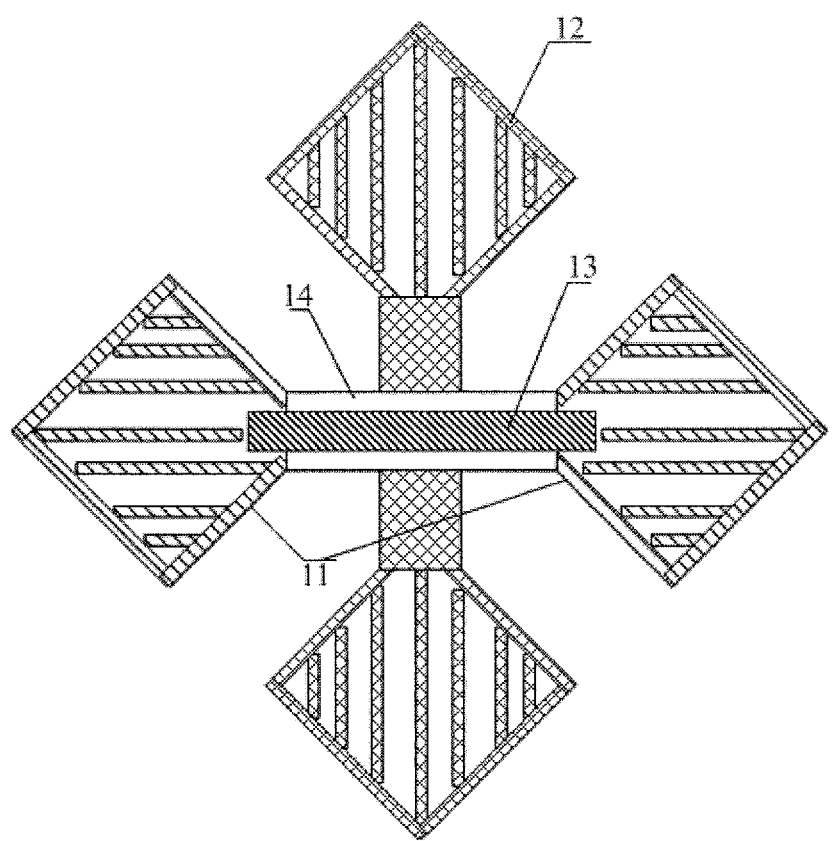
FIG. 4 is a structure diagram I of a first transparent electrode and a second transparent electrode in the touch screen provided in embodiment I of the present invention.

Preferably, referring to FIG. 4, the first transparent electrode 11 is slit-like, with a structure similar to the first conductive layer 15 as illustrated in FIG. 2. For example, slits of the first transparent electrodes 11 coincide with projections of slits between first electrodes 151 in the first conductive layer in the vertical direction. The second transparent electrode 12 is slit-like, with a structure similar to the second conductive layer 16 as illustrated in FIG. 2. For example, slits of the second transparent electrode 12 coincide with projections of slits between second electrodes 161 in the second conductive layer in the vertical direction. The shaded portions of the areas where the first transparent electrode 11 is located illustrated in FIG. 4 are conducting areas, and the shaded portions of the areas where the second transparent electrode 12 is located are conducting areas.

Figure 5:
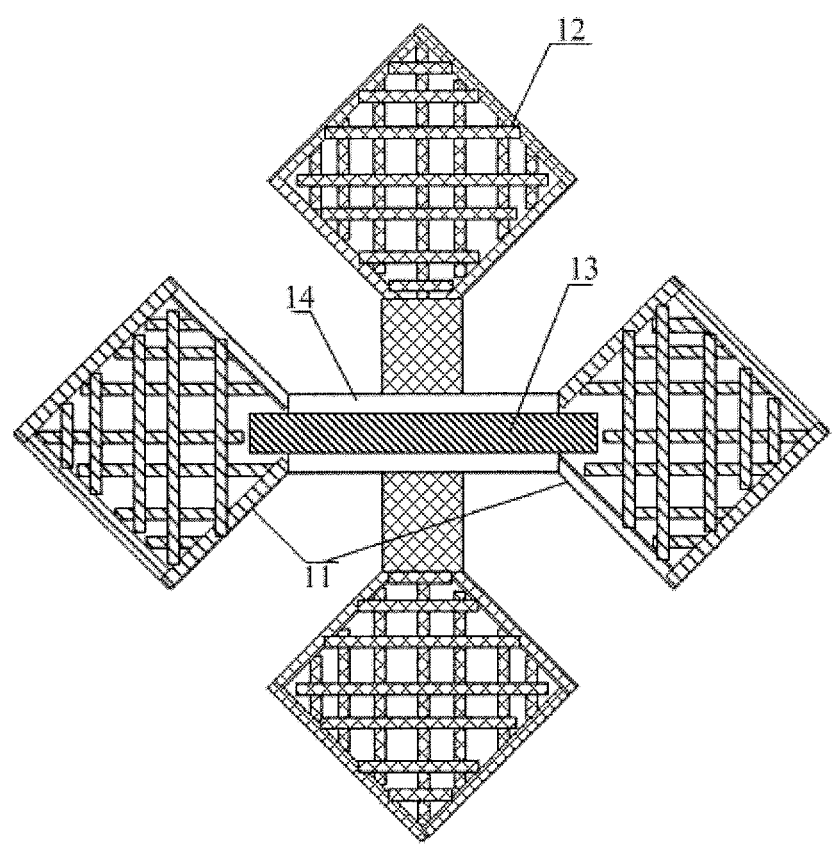
FIG. 5 is a structure diagram II of a first transparent electrode and a second transparent electrode in the touch screen provided in embodiment I of the present invention.

Preferably, referring to FIG. 5, the first transparent electrode 11 is a grid-like electrode, with a structure similar to the first conductive layer 15 as illustrated in FIG. 3. For example, the hollowed-out areas in the grid-like first transparent electrode 11 coincide with the projections of the hollowed-out areas of the grid-like first conductive layer 15 as illustrated in FIG. 3 in the vertical direction. The second transparent electrode 12 is a grid-like electrode with a structure similar to the second conductive layer 16 as illustrated in FIG. 3. For example, the hollowed-out areas in the grid-like second transparent electrode 12 coincide with the projections of the hollowed-out areas of the grid-like second conductive layer 16 as illustrated in FIG. 3 in the vertical direction.

The first transparent electrode and the second transparent electrode provided in the above-mentioned embodiments are not limited to the case where they are all grid-like or strip-like ones. For example, one of the first transparent electrode and the second transparent electrode is grid-like, and the other is strip-like. Or, a portion of areas of the first transparent electrode or the second transparent electrode are grid-like, and other areas are strip-like. Further, the shape of the first conductive layer and the second conductive layer provided in the above-mentioned embodiments is not limited to that coinciding with projections of the first transparent electrodes and the second transparent electrodes in the vertical direction. For example, the first transparent electrode is grid-like (or strip-like), and the first conductive layer is strip-like (or grid-like). The arrangement of the second transparent electrodes is similar, and will not be described any more here.

Furthermore, first conductive layers on both sides of the first transparent electrode are not limited to be in mirror symmetry. For example, one side of the first transparent electrode is strip-like, and the other side is grid-like. The arrangement of the second transparent electrodes is similar, and will not be described any more here.

In the present embodiment, for example, when the first transparent electrode and the second transparent electrode are grid-like electrodes, the first conductive layer and the second conductive layer may be grid-like conductive layers, the hollowed-out areas of the first transparent electrodes coincide with the hollowed-out areas of the first conductive layer, and the hollowed-out areas of the second transparent electrodes coincide with the hollowed-out areas of the second conductive layer. With such an arrangement, touch accuracy and sensitivity in various areas of the touch screen is high, and the touch accuracy and sensitivity are consistent in degree, resulting in the good touch effect. Further, both the first transparent electrodes and the second transparent electrodes have reduced signal delay that not only improves sensitivity and accuracy of small size touch screens but also addresses the problem in connection with poor sensitivity and accuracy of large size touch screens due to signal delay. Thereby, the present embodiment realizes a large size touch screen with high touch accuracy and sensitivity.

Preferably, the first conductive layer may be, but not limited to, a layer formed of metallic copper (Cu), metallic aluminum (Al), metallic molybdenum (Mo), metallic neodymium (Nd) or an alloy containing at least two of Cu, Al, Mo and Nd. Similarly, the second conductive layer may be, but not limited to, a layer formed of Cu, Al, Mo, Nd or an alloy containing at least two metals of Cu, Al, Mo and Nd.

Preferably, the first transparent electrodes and the second transparent electrodes may be made of transparent metal oxides such as indium tin oxide (ITO) or indium zinc oxide (IZO). Furthermore, the first transparent electrodes and the second transparent electrodes may be made of carbon nano material.

For example, the arrangement of the first transparent electrodes and the second transparent electrodes includes at least the following modes:

Mode I: a plurality of diamond shaped sub-electrodes being connected in series (as illustrated in FIG. 1).

Mode II: a plurality of rectangular sub-electrodes being connected in series.

Mode III: one of the two electrodes comprising strip electrodes, the other comprising a plurality of disconnected rectangular or diamond shaped sub-electrodes.

In the touch screen provided in the present embodiment, the first transparent electrodes and the second transparent electrodes both can be made according to mode I, mode II or mode III; or one of them is made according to mode I, the other mode II, which is not specifically limited here.

The first transparent electrodes and the second transparent electrodes provided in the present embodiment may be arranged in the same layer or in different layers, which is not limited here. Also, the first conductive layer and the second conductive layer may be arranged in the same layer or different layers depending on specific conditions.

In the touch screen provided in embodiment I, the first transparent electrodes and the second transparent electrodes are made in the same layer and may be formed in one single process, and therefore a first transparent electrode is broken into a plurality of first transparent sub-electrodes in an area intersecting a second transparent electrode, and two broken first transparent sub-electrodes that are adjacent to each other are connected with a conductive sheet. Such an arrangement is advantageous for simplifying process flow for manufacturing touch screens.

Of course, in the touch screen provided in embodiment I, the first transparent electrodes and the second transparent electrodes may also be made in different layers with an insulation layer provided therebetween to ensure that the first transparent electrodes and the second transparent electrodes are insulated from each other. In the manufacturing process flow, for example, it is also possible to manufacture one of the first transparent electrode and the second transparent electrode first, then form the insulation layer, and finally form the other of the first transparent electrodes and the second transparent electrodes.

Embodiment II: Based on Two-Layer Type Touch Screen

Figure 6:
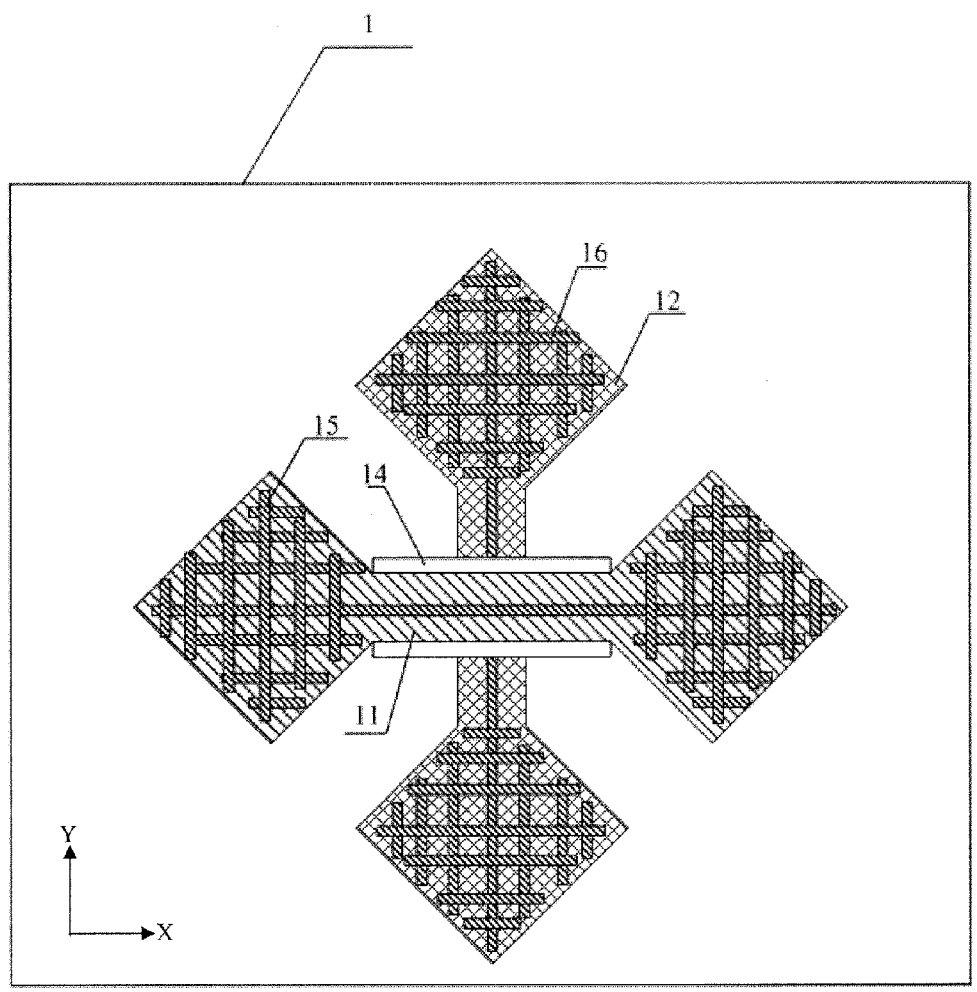
FIG. 6 is a structure diagram of a touch screen provided in embodiment II of the present invention.

Referring to FIG. 6, the touch screen provided in the present embodiment II includes: a substrate 1; a plurality of first transparent electrodes 11 arranged in a first direction (X direction) on the substrate 1; and a plurality of second transparent electrodes 12 arranged in a second direction (Y direction) on the substrate 1. The first transparent electrodes 11 are insulated from the second transparent electrodes 12 via an insulation layer 14 at least in intersection areas; the first transparent electrodes 11 are provided with a first conductive layer 15 on at least one sides, and the first conductive layer 15 is located in areas where the first transparent electrodes 11 are located, and/or the second transparent electrodes 12 are provided with a second conductive layer 16 on at least one sides, and the second conductive layer 16 is located in where the second transparent electrodes 12 are located. The first conductive layer 15 and the second conductive layer 16 are connected in parallel with the first transparent electrode 11 and the second transparent electrode 12 respectively, and are for example metal layers or alloy layers. FIG. 6 shows only one first transparent electrode 11 and one second transparent electrode 12.

The touch screen provided in embodiment I is similar to that of embodiment II, and is different in that embodiment II provides the first transparent electrodes and the second transparent electrodes in a two-layer configuration and insulated via an insulation layer. For example, in the manufacturing process, it is possible to form the first transparent electrodes and the first conductive layer first, and then form the insulation layer, and finally form the second transparent electrodes and the second conductive layer.

The arrangement of the first transparent electrodes, the second transparent electrodes, the first conductive layer and the second conductive layer is similar to that of embodiment I (namely the patterns of the layers, and the relative position in the up-and-down direction), and is different in that the first transparent electrodes, the second transparent electrodes, the first conductive layer and the second conductive layer need not be broken respectively. Furthermore, the manufacturing materials for the electrodes and conductive layers are the same as embodiment I, and will not be described any more here.

Embodiment III: Based on Single Layer Type Touch Screen

Figure 7:
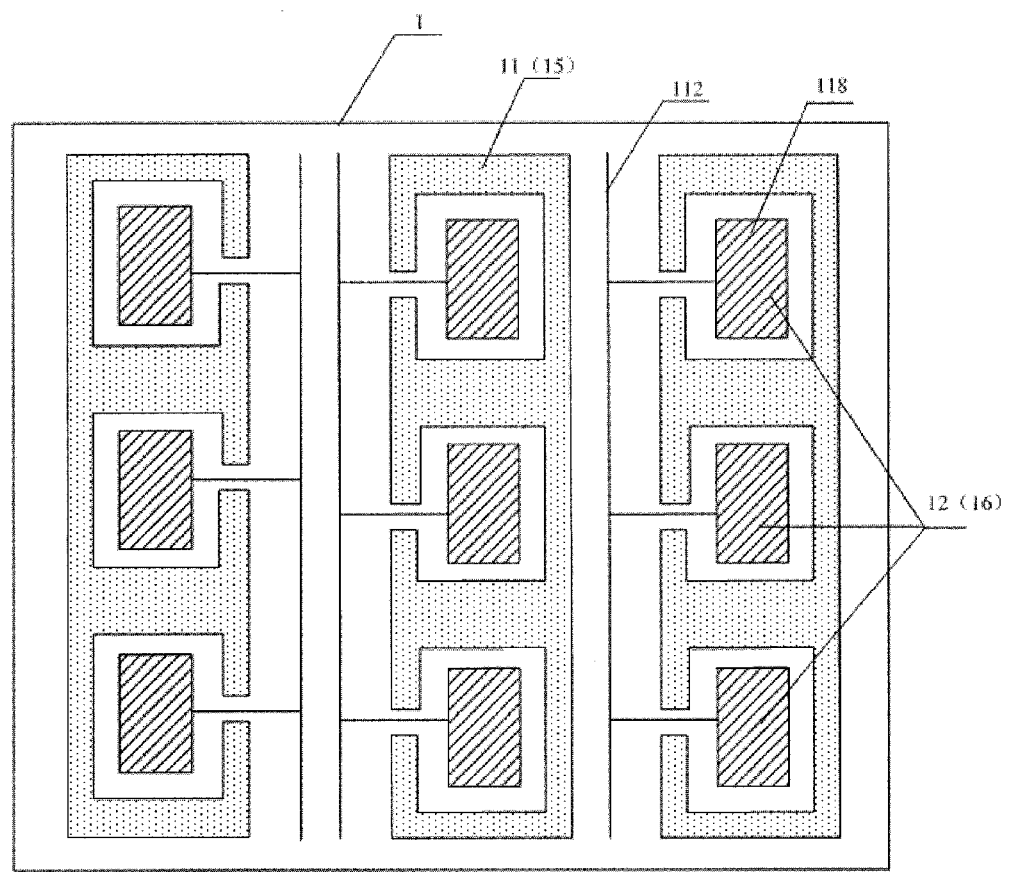
FIG. 7 is a structure diagram of a touch screen provided in embodiment III of the present invention.

Referring to FIG. 7, the touch screen provided in the present embodiment III includes: a substrate 1; a plurality of first transparent electrodes 11 arranged in a first direction on the substrate 1; and a plurality of second transparent electrodes 12 arranged in a second direction on the substrate 1. Adjacent two first transparent electrodes 11 and second transparent electrodes 12 are coupled without intersection, crossover and joint formed therebetween, that is, the first transparent electrodes 11 and the second transparent electrodes 12 are insulated and their projections on the substrate 1 do not overlap with each other; the first transparent electrodes 11 are provided with a first conductive layer 15 on one sides, and the first conductive layer 15 is located in areas where the first transparent electrodes 11 are located; and/or the second transparent electrodes 12 are provided with a second conductive layer 16 on at least one sides, and the second conductive layer 16 is located in areas where the second transparent electrodes 12 are located.

The first conductive layer 15 and the second conductive layer 16 are connected in parallel with the first transparent electrode 11 and the second transparent electrode 12 respectively, and may be a metal layer or an alloy layer.

The touch screen provided in embodiment III is similar to that in embodiment I and different in that the shape and relative position of the first transparent electrodes and the second transparent electrodes are different from embodiment I. The first transparent electrodes and the second transparent electrodes are located in the same layer without any intersection, crossover and joint therebetween and are insulated from each other. The arrangement of the first transparent electrodes, the second transparent electrodes, the first conductive layer and the second conductive layer, such as strip, grid or surface-like is the same as embodiment I, and the manufacturing material of film layer is the same as embodiment I, which will not be described in detail here.

Preferably, for example, the first transparent electrodes 11 are strip electrodes provided with a plurality of hollowed-out areas of regular patterns therein, and each hollowed-out area is a hollowed-out area with an opening at an edge of the first transparent electrode 11. The second transparent electrodes 12 comprise a plurality of sub-electrodes 118 corresponding to hollowed-out areas in terms of shape and position, with smaller areas than the hollowed-out areas, and sub-electrodes 118 corresponding to the first transparent electrodes 11 are connected by a lead 112.

Preferably, for example, the opening directions of the hollowed-out areas on the first transparent electrodes 11 may be completely or partially identical.

Preferably, for example, the hollowed-out areas are of a rectangle, and sub-electrodes 118 corresponding to the first transparent electrodes 11 are of a rectangle. There are gaps between the sub-electrodes 118 and the first transparent electrodes 11 and they are kept insulated from each other.

Preferably, for example, the first transparent electrodes 11 and the second transparent electrodes 12 may be of a planar structure without hollowed-out area or a hollowed out structure. The first conductive layer 15 and the second conductive layer 16 may be planar or hollowed out.

For example, the hollowed out shape may be of a strip-like or grid-like shape, which is not described any more here.

The first transparent electrodes 11 and the second transparent electrodes 12 as illustrated in FIG. 7 are planar while the first conductive layer 15 and the second conductive layer 16 are planar.

Preferably, when at least one of the first transparent electrode 11, the second transparent electrode 12, the first conductive layer 15 and the second conductive layer 16 is grid-like or strip-like, the locations of the grid-like or strip-like electrodes corresponds to the black matrix areas in the display device, and slits between grid-like or strip-like electrodes correspond to the display areas of pixels.

The touch screen provided in embodiments I to III may further include: first leads for connecting the first transparent electrodes and a signal source for providing signals to the first transparent electrodes; and second leads for connecting the second transparent electrodes and a signal source for providing signals to the second transparent electrodes. The first conductive layer further includes parts on at least one side of the first leads and connected in parallel with the first leads. The second conductive layer further includes parts on at least one side of the second leads and connected in parallel with the second leads. This can also realize reduced resistance of leads, increase conductivity, reduce signal delay RC, and improve touch accuracy and sensitivity of the touch screen.

The manufacturing process of the touch screen provided in embodiments I, II and III will be described respectively below. Furthermore, description will be given with an example in which areas where the first transparent electrodes and the second transparent electrodes are located are provided with a conductive layer on both sides.

The manufacturing method of the touch screen provided in embodiments of the present invention mainly includes the following steps: a process of forming first transparent electrodes and second transparent electrodes on the substrate; and a process of forming the first conductive layer and the second conductive layer.

The forming process of the touch screen provided in embodiment I will be described specifically below.

Step 1: forming a first conductive layer and a second conductive layer on the substrate at the same time.

First, forming a metal layer or an alloy layer on the substrate on which first transparent sub-electrodes and second transparent electrodes are to be formed by a coating process. Then according to a preset pattern of the first conductive layer and a pattern of the second conductive layer and a preset formation location, the metal layer or an alloy layer undergoes photoresist coating, exposing, developing and photoetching, to form a preset first conductive layer pattern on the substrate, and the first conductive layer pattern is bonded with the first transparent electrode to be formed later for forming parallel connection between them. A preset second conductive layer pattern is formed on the substrate which is bonded with the second transparent electrode to be formed later to form a parallel connection between them.

The first conductive layer and the second conductive layer may be a strip electrode pattern as illustrated in FIG. 2 or a grid-like electrode pattern as illustrated in FIG. 3.

Step 2: forming the first transparent electrodes and the second transparent electrodes at the same time.

First, a transparent conductive layer such as an ITO layer is deposited on the substrate by a coating process. Then the transparent conductive layer is subjected to photoresist coating, exposing, developing and photoetching according to a preset first transparent sub-electrode and a preset second transparent electrode pattern and preset formation locations to than first transparent sub-electrodes and second transparent electrodes on the substrate.

When the first transparent sub-electrodes and the second transparent electrodes are of a planar structure, it is not required to form patterns on the first transparent electrodes and the second transparent electrodes. When the first transparent sub-electrodes and the second transparent electrodes are of grid-like or slit-like structures, during the exposure, development and photoetching, the grid-like or slit-like first transparent electrodes and second transparent electrodes are formed.

Step 3: forming a first conductive layer and a second conductive layer at the same time on the substrate with the first transparent electrodes and the second transparent electrodes having been already formed thereon.

First, a metal layer or an alloy layer is formed by a coating process on the substrate on which first transparent sub-electrodes and second transparent electrodes have been formed. Then the metal layer or an alloy layer is subjected to photoresist coating, exposing, developing and photoetching according to a preset pattern of the first conductive layer and a preset pattern of the second conductive layer and a preset formation location, to form a preset first conductive layer pattern on the substrate and on the first transparent electrodes, and to form a preset second conductive layer pattern on the second transparent electrodes; the preset first conductive layer pattern is bonded with the first transparent electrode to form parallel connection between them, and the preset second conductive layer pattern is bonded with the second transparent electrodes to form parallel connection between them.

The first conductive layer and the second conductive layer may be a strip electrode pattern as illustrated in FIG. 2 or a grid-like electrode pattern as illustrated in FIG. 3.

Step 4: forming an insulation layer.

A transparent insulation layer such as a silicon oxide, silicon nitride or silicon oxynitride layer is formed on the substrate with the first conductive layer and the second conductive layer already formed thereon by a coating process. An insulation layer is provided at the intersection areas of the first transparent electrodes and the second transparent electrodes by a patterning process, while the insulation layer in other areas is etched away. The insulation layer is used to insulate the second transparent electrodes and the second conductive layer under the insulation layer from the conductive sheet to be formed.

Step 5: forming a conductive sheet.

A conductive layer such as a metal or alloy layer is formed by a coating process on the substrate with an insulation layer having been formed thereon. A conductive sheet is formed on each insulation layer formed in step 4 by a patterning process, which has a length greater than the distance between two adjacent first transparent sub-electrodes to ensure two ends of the conductive sheet are connected with the adjacent two first transparent sub-electrodes respectively.

It is to be noted that in embodiments of the present invention, it is also possible to connect two adjacent first transparent sub-electrodes by means of via and bridge. For example, in forming the insulation layer in step 4, it is ensured that the insulation layer covers adjacent two ends of adjacent two first transparent sub-electrodes and vias are formed in the areas corresponding to the ends in the insulation layer so as to expose parts of the first transparent sub-electrode and the second transparent sub-electrode. In step 5, the conductive sheet is provided directly between two vias and cover the two vias such that adjacent two first transparent sub-electrodes are connected by the conductive sheet.

It is noted that in the above-mentioned method of manufacturing the touch screen, step 1 or step 3 are optional. If the first conductive layer and the second conductive layer are provided on one side of the first transparent sub-electrodes and one side of the second transparent electrodes only, it is possible to carry out only one of step 1 and step 3.

Or, the above-mentioned process for manufacturing the touch screen may also be the following steps.

First, the conductive sheet is manufactured at corresponding locations, then the insulation layer on the conductive sheet is manufactured, and finally the first transparent electrodes and the second transparent electrodes as well as the first conductive layer and the second conductive layer are manufactured. This will not be described any more here.

The forming process of the touch screen provided in embodiment 11 will be described specifically below.

Step 1: forming the first conductive layer.

First, a metal layer or an alloy layer is formed by a coating process on the substrate in areas in which first transparent electrodes are to be formed. Then a first conductive layer is formed according to a preset pattern of the first conductive layer and formation locations by one patterning process (namely photoresist coating, exposure, development, and photoetching). The formed first conductive layer is similar to the pattern of the first conductive layer 15 as illustrated in FIG. 2 or 3.

Step 2: forming the first transparent electrodes.

First, a transparent conductive layer is formed on the substrate by a coating process. Then first transparent electrodes are formed according to a preset pattern of the first transparent electrodes and formation locations by one patterning process (namely photoresist coating, exposure, development, and photoetching). The formed first transparent electrodes are similar to the pattern of the first transparent electrodes 11 as illustrated in FIG. 4 or 5, or may be planar electrodes.

Step 3: forming the first conductive layer.

First, a metal layer or an alloy layer is formed by a coating process on the substrate formed with first transparent electrodes. Then a first conductive layer is formed according to a preset pattern of the first conductive layer and formation locations by one patterning process (namely photoresist coating, exposure, development, and photoetching). The formed first conductive layer is similar to the pattern of the first conductive layer 15 as illustrated in FIG. 2 or 3.

Step 4: forming an insulation layer.

A transparent insulation layer such as a silicon oxide, silicon nitride or silicon oxynitride layer is formed by a coating process on the substrate with the first transparent electrodes and the first conductive layer having been already formed thereon. An insulation layer is provided at the intersection areas of the first transparent electrodes and the second transparent electrodes by a patterning process, and the insulation layer in other areas is etched away. The insulation layer is used to insulate the second transparent electrodes and the first conductive layer under the insulation layer from the second transparent electrodes and the second conductive layer over the insulation layer.

Step 5: forming the second conductive layer.

First, a metal layer or an alloy layer is formed by a coating process on the substrate in areas in which first transparent electrodes are to be formed. Then a second conductive layer is formed according to a preset pattern of the second conductive layer and formation locations by one patterning process (namely photoresist coating, exposure, development, and photoetching). The formed second conductive layer is similar to the pattern of the second conductive layer 16 as illustrated in FIG. 2 or 3.

Step 6: forming the second transparent electrodes.

First, a transparent conductive layer is formed by a coating process on the substrate formed with the first transparent electrodes, the first conductive layer and the insulation layer. Then second transparent electrodes are formed according to a preset pattern of the second transparent electrodes and formation locations by one patterning process (namely photoresist coating, exposure, development, and photoetching). The formed second transparent electrodes are similar to the pattern of the second transparent electrodes 12 as illustrated in FIG. 4 or 5, or may be planar electrodes.

Step 7: forming the second conductive layer.

First, a metal layer or an alloy layer is formed by a coating process on the substrate formed with the first transparent electrodes, the first conductive layer, the insulation layer and the second transparent electrodes. Then a second conductive layer is formed according to a preset pattern of the second conductive layer and formation locations by one patterning process (namely photoresist coating, exposure, development, and photoetching). The formed second conductive layer is similar to the pattern of the second conductive layer 16 as illustrated in FIG. 2 or 3.

Step 1 or 3 is optional. Likely, step 5 or step 7 is optional. If the first conductive layer and the second conductive layer are provided only on one side of the first transparent electrodes and one side of the second transparent electrodes respectively, it is possible to carry out only one of step 1 and step 3, and only one of step 5 and step 7.

The forming process of the touch screen provided in embodiment III will be described specifically below.

Step 1: forming the first conductive layer and the second conductive layer.

First, a metal layer or an alloy layer is formed by a coating process on the substrate in areas in which first transparent electrodes and second transparent electrodes are formed. Then a first conductive layer and a second conductive layer are formed according to a preset pattern of the first conductive layer and the second conductive layer and formation locations by one patterning process (namely photoresist coating, exposure, development, and photoetching). The formed first conductive layer and second conductive layer are similar to the pattern of the first conductive layer 15 and the second conductive layer 16 as illustrated in FIG. 7.

Step 2: forming the first transparent electrodes and the second transparent electrodes.

First, a transparent conductive layer is formed on the substrate by a coating process. Then first transparent electrodes and second transparent electrodes are formed according to a preset pattern of the first transparent electrodes and the second transparent electrodes and formation locations by one patterning process (namely photoresist coating, exposure, development, and photoetching). The formed first transparent electrodes and second transparent electrodes are similar to the patterns of the first transparent electrodes 11 and the second transparent electrodes 12 as illustrated in FIG. 7, or may be electrodes with hollowed-out areas such as grid-like or strip-like electrodes.

Step 3: forming the first conductive layer and the second conductive layer.

The forming method and forming locations are similar to that of step 1, which are not described any more here.

Steps 1 and 3 are optional. If the first conductive layer and the second conductive layer are provided on one side of the first transparent electrodes and one side of the second transparent electrodes only, it is possible to carry out only one of step 1 and step 3.

The specific formation process of the touch screen provided in the above-mentioned embodiment III is a preferred embodiment in which the process flow is simple for the formed touch screen with this approach.

The above-mentioned manufacturing method of the touch screen corresponding to embodiments I to III respectively may further include the following processes.

While the first transparent electrodes and/or second transparent electrodes are formed, first leads and/or second leads for connecting the first transparent electrodes and/or second transparent electrodes to a signal source are formed as well, and when forming a first conductive layer on at least one side of the first leads, a second conductive layer on at least one side of the second leads are formed.

An embodiment of the present invention further provides a display device including the touch screen provided in any one of the above-mentioned embodiments I to III. The display device may be a display device such as a liquid crystal panel, a liquid crystal display, a liquid crystal TV, an organic electroluminescent display OLED panel, an OLED display, an OLED TV or electronic paper with touch function.

The touch screen in the display device may be an in-cell touch screen or an add-on touch screen.

Preferably, for example, the first transparent electrodes may be slit-like, and slits of the first transparent electrodes coincide with projections of slits between the first electrodes in the vertical direction. The second transparent electrodes may be slit-like, and slits of the second transparent electrodes coincide with projections of slits between the second electrodes in the vertical direction. Slits in the first transparent electrodes and slits in the second transparent electrodes correspond to transmitting areas of pixels in the display device. Or, the first transparent electrodes may be grid-like, and slits of the first transparent electrodes coincide with projections of slits between the first electrodes and the third electrodes in the vertical direction. The second transparent electrodes may be grid-like, and slits of the second transparent electrodes coincide with projections of slits between the second electrodes and the fourth electrodes in the vertical direction. Slits in the first transparent electrodes and slits in the second transparent electrodes correspond to transmitting areas of pixels in the display device.

Preferably, for example, the first conductive layer and the second conductive layer provided in the touch screen may be located in areas corresponding to the black matrix areas of the display screen, that is, projections of the first conductive layer and the second conductive layer on the display screen are in the projections of the black matrix areas on the display screen. The black matrix is configured to for example define pixels and separate pixels from each other.

The first conductive layer and the second conductive layer do not influence the aperture ratio and light transmittance of pixels in the display screen.

Embodiments of the present invention are described only with three types of typical touch screens and manufacturing methods thereof as examples, however the touch screen structures provided in embodiments of the present invention are not limited to the touch screens provided in embodiments I to III. The first transparent electrodes and the second transparent electrodes are not limited to be formed directly on the substrate, but also can be located on another layer structure. That is, any screens that contain the first transparent electrodes and the second transparent electrodes provided in embodiments of the present invention and the first conductive layer and the second conductive layer located in areas where the first transparent electrodes and the second transparent electrodes are located, and ensure that the first conductive layer and the second conductive layer contact the first transparent electrodes and the second transparent electrodes respectively, are within the scope of the present invention and can realize the object of a touch screen with high touch effect of the present invention.

In summary, in the touch screen provided in embodiments of the present invention, a conductive layer is provided on one side of the first transparent electrodes and/or the second transparent electrodes, which may be of metal or alloy. Assuming that the first conductive layer is provided on the first transparent electrodes for example, metal or alloy for the first conductive layer has conductivity much greater than that of the first transparent electrodes, and the first conductive layer is located on the first transparent electrodes and they are connected in parallel. The first transparent electrodes provided with the first conductive layer as a whole have resistance much lower than that of the first transparent electrodes themselves, which reduces signal delay of the first transparent electrodes, improves touch accuracy and sensitivity of the touch screen, and in turn enhances the touch effect of the touch screen.

What are described above is related to the illustrative embodiments of the disclosure only and not limitative to the scope of the disclosure; the scopes of the disclosure are defined by the accompanying claims.

The invention claimed is:

1. A touch screen comprising:
a plurality of first transparent electrodes and a plurality of second transparent electrodes disposed on a substrate;
first conductive layers disposed on two sides of the first transparent electrodes and connected in parallel with the first transparent electrodes, and/or second conductive layers disposed on two sides of the second transparent electrodes and connected in parallel with the second transparent electrodes;
wherein one set of the first transparent electrodes and the second transparent electrodes are touch driving electrodes, the other set are touch sensing electrodes, and the first conductive layers and the second conductive layers are metal layers or alloy layers; and
wherein the first conductive layers comprise a plurality of first electrodes, the first transparent electrodes are slit-like, and projections of slits of the first transparent electrodes overlap with projections of slits between the first electrodes of the first conductive layers on the substrate.

2. The touch screen of claim 1, wherein the first transparent electrodes extend in a first direction and the second transparent electrodes extend in a second direction intersecting the first direction.

3. The touch screen of claim 2, wherein the first transparent electrodes are broken into a plurality of first transparent sub-electrodes at intersection areas with the second transparent electrodes; and adjacent first transparent sub-electrodes are connected through conductive sheets.

4. The touch screen of claim 2, wherein the first transparent electrodes and the second transparent electrodes are formed by connecting in series a plurality of diamond shaped sub-electrodes respectively; or
the first transparent electrodes and the second transparent electrodes are formed by connecting in series a plurality of rectangular sub-electrodes respectively; or
the second transparent electrodes are strip-like electrodes.

5. The touch screen of claim 1, wherein the first transparent electrodes and the second transparent electrodes extend in a first direction and are arranged by coupling without any intersection, crossover and joint therebetween.

6. The touch screen of claim 5, wherein the first transparent electrodes are provided with a plurality of hollowed-out areas of regular pattern, which are non-closed hollowed-out areas with openings at edges of the first transparent electrodes;
the second transparent electrodes comprise a plurality of sub-electrodes disposed at hollowed-out areas of the first transparent electrodes, each of the sub-electrodes is connected by a wire adjacent to the first transparent electrodes, and the wire is connected with corresponding sub-electrodes through an opening at an edge of the first transparent electrodes and is insulated from the first transparent electrodes.

7. The touch screen of claim 1, wherein the plurality of first electrodes from the first conductive layers in a first direction; and
the second conductive layers comprise a plurality of second electrodes extending in a second direction intersecting the first direction.

8. The touch screen of claim 7,
wherein the second transparent electrodes are slit-like, and projections of slits of the second transparent electrodes overlap with projections of slits between the second electrodes on the substrate.

9. The touch screen of claim 8, wherein the first conductive layers further comprise a plurality of third electrodes extending in the second direction to make the first conductive layers to be grid-like first conductive layers; and
the second conductive layers further comprise a plurality of fourth electrodes extending in the first direction to make the second conduct layers to be grid-like second conductive layers.

10. The touch screen of claim 9, wherein the first transparent electrodes are grid-like, and hollowed-out areas in the grid-like first transparent electrodes overlap with projections, on the substrate, of hollowed-out areas in the grid-like first conductive layers; and
the second transparent electrodes are grid-like, and hollowed-out areas in the grid-like second transparent electrodes overlap with projections, on the substrate, of hollowed-out areas in the grid-like second conductive layers.

11. The touch screen of claim 1, wherein the first conductive layers are formed of metallic copper, metallic aluminum, metallic molybdenum or metallic neodymium or an alloy containing at least two metals of metallic copper, metallic aluminum, metallic molybdenum or metallic neodymium;

the second conductive layers are formed of metallic copper, metallic aluminum, metallic molybdenum or metallic neodymium or an alloy containing at least two metals of metallic copper, metallic aluminum, metallic molybdenum or metallic neodymium.

12. The touch screen of claim 1, further comprising:

first leads for connecting the first transparent electrodes with a signal source for providing signals to the first transparent electrodes; and second leads for connecting the second transparent electrodes with another signal source for providing signals to the second transparent electrodes;

wherein the first conductive layers further comprise parts on two sides of the first lead and connected in parallel with the first lead; and the second conductive layers further comprise parts on two sides of the second lead and connected in parallel with the second lead.

13. A display device comprising the touch screen of claim 1, wherein the first conductive layers and the second conductive layers in the touch screen are located in areas corresponding to black matrix in the touch screen.

14. The display device of claim 13, wherein the first transparent electrodes are slit-like, and slits of the first transparent electrodes overlap with projections of slits between the first electrodes in the vertical direction; the second transparent electrodes are slit-like, and slits of the second transparent electrodes overlap with projections of slits between the second electrodes in the vertical direction; the slits in the first transparent electrodes and the slits in the second transparent electrodes correspond to transmitting areas of pixels in the display device;

or, the first transparent electrodes are grid-like, and slits of the first transparent electrodes overlap with projections of slits between the first electrodes and the third electrodes in the vertical direction; the second transparent electrodes are grid-like, and slits of the second transparent electrodes overlap with projections of slits between the second electrodes and the fourth electrodes in the vertical direction; the slits in the first transparent electrodes and the slits in the second transparent electrodes correspond to transmitting areas of pixels in the display device.

15. A manufacturing method of a touch screen comprising:

forming a plurality of first transparent electrodes and a plurality of second transparent electrodes on a substrate; and forming first conductive layers connected in parallel with the first transparent electrodes on two sides of the first transparent electrodes, and/or forming second conductive layers connected in parallel with the second transparent electrodes on two sides of the second transparent electrodes;

wherein the first conductive layers and the second conductive layers are metal layers or alloy layers; and wherein the first conductive layers comprise a plurality of first electrodes, the first transparent electrodes are slit-like, and projections of slits of the first transparent electrodes overlap with projections of slits between the first electrodes of the first conductive layers on the substrate.

16. The method of claim 15, wherein forming the first transparent electrodes extending in a first direction and the second transparent electrodes extending in a second direction intersecting the first direction on the substrate at the same time, the first transparent electrodes being broken into a plurality of first transparent sub-electrodes at intersection areas with the second transparent electrodes;

forming the first conductive layers and the second conductive layers, on the substrate formed with the first transparent electrodes and the second transparent electrodes, in areas where the first transparent sub-electrodes and the second transparent electrodes are located respectively;

forming an insulation layer on the substrate formed with the first conductive layers and the second conductive layers at intersection areas of the second conductive layers and the first conductive layer; and forming a conductive sheet connected with two adjacent first transparent sub-electrodes on the substrate formed with the insulation layer and on the insulation layer at the intersection areas;

or, forming the first conductive layers arranged in a first direction and the second conductive layers arranged in a second direction intersecting the first direction on the substrate at the same time, the first conductive layers being broken at intersection areas with the second conductive layers;

forming the first transparent electrodes and the second transparent electrodes, on the substrate formed with the first conductive layers and the second conductive layers, in areas where the first conductive layers and the second conductive layers are located respectively, the first transparent electrodes being broken into a plurality of first transparent sub-electrodes at intersection areas with the second transparent electrodes;

forming an insulation layer on the substrate formed with the first transparent electrodes and the second transparent electrodes and on the second transparent electrodes at intersection areas with the first transparent electrodes; and forming a conductive sheet connected with two adjacent first transparent sub-electrodes on the substrate formed with the insulation layer and on the insulation layer at the intersection areas.

17. The method of claim 16, further comprising, before forming of the first conductive layers and the second conductive layers on the first transparent electrodes and the second transparent electrodes respectively and before forming of the first transparent electrodes and the second transparent electrodes: forming the first conductive layers and the second conductive layers at areas to be formed with the first transparent electrodes and the second transparent electrodes respectively; or after forming of the first conductive layers and the second conductive layers and after forming of the first transparent electrodes and the second transparent electrodes on the first conductive layers and the second conductive layers respectively: forming the first conductive layers and the second conductive layers again on the first transparent electrodes and the second transparent electrodes respectively.

18. The method of claim 15, wherein:

forming the first transparent electrodes arranged in a first direction on the substrate;

forming the first conductive layers on the substrate formed with the first transparent electrodes and in areas where the first transparent electrodes are located;

forming an insulation layer on the substrate formed with the first transparent electrodes and the first conductive layers at intersection areas of the first transparent electrodes and second transparent electrodes to be formed;

forming the second transparent electrodes arranged in a second direction intersecting the first direction on the substrate formed with the insulation layer; and forming the second conductive layers on the substrate formed with the second transparent electrodes and in areas where the second transparent electrodes are located;

or, forming the first conductive layers on the substrate;

forming the first transparent electrodes on the substrate formed with the first conductive layers and in areas where the first conductive layers are located;

forming an insulation layer on the substrate formed with the first transparent electrodes and the first conductive layers at intersection areas of the first transparent electrodes and second transparent electrodes to be formed;

forming the second conductive layers intersecting the first conductive layers on the substrate formed with the insulation layer and on the insulation layer; and forming the second transparent electrodes on the substrate formed with the second conductive layers and in areas where the second conductive layers are located.

19. The method of claim 15, wherein:

forming the first transparent electrodes and the second transparent electrodes arranged in a same direction on the substrate, the first transparent electrodes and the second transparent electrodes being arranged by coupling without any intersection, crossover and joint therebetween;

forming the first conductive layers and the second conductive layers on the substrate formed with the first transparent electrodes and the second transparent electrodes and in areas where the first transparent electrodes and the second transparent electrodes are located;

or, forming the first conductive layers and the second conductive layers arranged in a first direction on the substrate at the same time, the first conductive layers and the second conductive layers being arranged by coupling without any intersection, crossover and joint therebetween;

forming the first transparent electrodes and the second transparent electrodes on the substrate formed with the first conductive layers and the second conductive layers in areas where the first conductive layers and the second conductive layers are located respectively.

20. The method of claim 15, wherein, while forming the first transparent electrodes and/or second transparent electrodes, first leads for connecting the first transparent electrodes to a signal source and second leads for connecting the second transparent electrodes to another signal source are formed, the first conductive layers are formed on two sides of the first leads, and the second conductive layers are formed on two sides of the second leads.

* * * * *